United States Patent
Robb

(10) Patent No.: US 9,945,146 B2
(45) Date of Patent: Apr. 17, 2018

(54) CYLINDER ALIGNMENT MONITORING SYSTEM FOR A MAST OR DERRICK

(71) Applicant: Woolslayer Companies, Inc., Tulsa, OK (US)

(72) Inventor: Steve Robb, Tulsa, OK (US)

(73) Assignee: Woolslayer Companies, Inc., Tulsa, OK (US)

( * ) Notice: Subject to any disclaimer, the term of this patent is extended or adjusted under 35 U.S.C. 154(b) by 258 days.

(21) Appl. No.: 14/872,763

(22) Filed: Oct. 1, 2015

(65) Prior Publication Data

US 2017/0096832 A1    Apr. 6, 2017

(51) Int. Cl.
   *G01C 3/02*    (2006.01)
   *E04H 12/34*   (2006.01)
   *E21B 15/00*   (2006.01)

(52) U.S. Cl.
   CPC ........... *E04H 12/345* (2013.01); *E21B 15/00* (2013.01); *G01C 3/02* (2013.01)

(58) Field of Classification Search
   CPC .... G01C 15/004; G01C 15/008; G01C 15/02; G01C 15/06; G01C 5/00; G01C 3/02
   USPC .................................................. 33/700, 333
   See application file for complete search history.

(56) References Cited

U.S. PATENT DOCUMENTS

| | | | | |
|---|---|---|---|---|
| 3,896,885 A | * | 7/1975 | Dahlstrom | E21B 3/00 173/193 |
| 4,016,938 A | * | 4/1977 | Rice | B25B 23/1456 173/1 |
| 4,356,638 A | * | 11/1982 | McKenna | G01C 9/06 33/333 |
| 5,348,105 A | * | 9/1994 | Lappalainen | E21B 7/025 175/24 |
| 5,383,524 A | * | 1/1995 | Rinnemaa | E21B 7/022 173/1 |
| 6,941,666 B2 | * | 9/2005 | Parish | B66F 9/0755 33/308 |
| 8,122,974 B2 | * | 2/2012 | Kosoric | E21B 7/022 173/1 |
| 8,250,826 B1 | | 8/2012 | Vogt | |
| 8,353,132 B1 | | 1/2013 | Vogt et al. | |
| 8,720,128 B2 | | 5/2014 | Vogt | |
| 9,016,004 B2 | * | 4/2015 | Vogt | E21B 7/023 52/118 |
| 2010/0006337 A1 | * | 1/2010 | Kosoric | E21B 7/022 175/24 |
| 2017/0096832 A1 | * | 4/2017 | Robb | E04H 12/345 |

* cited by examiner

*Primary Examiner* — Yaritza Guadalupe-McCall
(74) *Attorney, Agent, or Firm* — Head, Johnson, Kachigian & Wilkinson, PC

(57) ABSTRACT

A cylinder alignment monitoring system for a mast or derrick hingedly connected to a substructure wherein at least a pair of extending cylinders move the mast or derrick between a storage position and an upright use position. The monitoring system includes a distance measurement device to determine the extension distance of each of the extending cylinders. A comparison device compares the extension distances measured for each of the extending cylinders.

19 Claims, 19 Drawing Sheets

CYLINDER ALIGNMENT MONITORING SYSTEM FOR A MAST OR DERRICK

BACKGROUND OF THE INVENTION

1. Field of the Invention

The present invention relates to a cylinder alignment monitoring system for a mast or derrick in order to monitor alignment of the cylinders during operation to move the mast or derrick between a storage and transportation position and an upright use position.

2. Prior Art

A mast or a derrick of a rig, such as a subterranean drilling rig, supports a block and tackle or similar equipment over a well hole in order to raise and lower drill bits, elongated drill pipes and various other equipment utilized downhole. Drilling rigs can be utilized for mineral exploration drilling, oil well drilling, natural gas drilling and water well drilling. The mast or derrick may vary in height but can often extend up to 200 feet.

Once one drilling project has been completed, the drilling rig is disassembled, then transported to a new location, and then re-assembled for use.

The mast or derrick is typically moved between a substantially horizontal storage or disassembly position and an upright use position by rotating the mast or derrick at the base approximately ninety degrees (90°).

The mast or derrick will be hingedly connected to equipment on the ground, such as a drilling floor supported by a substructure.

The mast or derrick will typically have four sides, or three sides with one open side. In one arrangement, the mast or derrick includes a pair of opposed sides, a back face and an open front. A pair of cylinders, such as hydraulic cylinders, are utilized to move the mast or derrick between the substantially horizontal position and the upright use position. In order to raise and lower the mast or derrick properly, the pair of hydraulic cylinders should operate in tandem. If the hydraulic cylinders do not operate in tandem, the mast or derrick may not be raised or lowered properly. The mast or derrick itself may become out of alignment. In extreme cases, damage can be done to the mast or derrick, as well as to the rig itself.

In the past, personnel have visually monitored the raising or lowering of the mast or derrick in order to confirm that the hydraulic cylinders are operating in tandem.

Accordingly, it is desirable to provide a cylinder alignment monitoring system for a mast or derrick in order to monitor alignment of the cylinders during movement of the mast or derrick between a storage and transportation position and an upright position.

SUMMARY OF THE INVENTION

The present invention is directed to a cylinder alignment monitoring system for a mast or derrick which rotates about a pair of hinges between a substantially horizontal storage and transportation position and an upright use position.

A pair of tubular, telescoping hydraulic cylinders each extends between a drill floor and the mast assembly. The hydraulic cylinders each have an extending ram and are extended in the in use, operational position. Conversely, the rams of the cylinders are retracted in the substantially horizontal, transportation and storage position.

The monitoring system includes a distance measurement device which includes a projector and receiver module attached to each of the hydraulic cylinders. The projector and receiver module includes a laser projector and laser receiver sensor.

A target module is attached to each of the hydraulic cylinders at or near the base of the hydraulic cylinder. The target modules reflect the laser light beams transmitted from the laser projectors back to the receiver modules.

A comparison device is wirelessly connected to each of the distance measurement devices by a wireless communication node. The comparison device receives information on the extension distance of each of the hydraulic cylinders from each of the distance measurement devices. The information may be communicated to a display controller which receives information on the distances extended. When the difference between the distances measured for each of the extending cylinders exceeds a pre-determined amount, an alarm may be generated.

The cylinder alignment monitoring system may also include an optional angle sensor module. The angle sensor module may be attached to one of the extending cylinders or, in a preferred embodiment, attached to one of the mast legs. The angle sensor module may include a wireless communication node for transmitting data information to the comparison device. The angle sensor module may provide information sensing the angle of the mast leg from a horizontal orientation.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
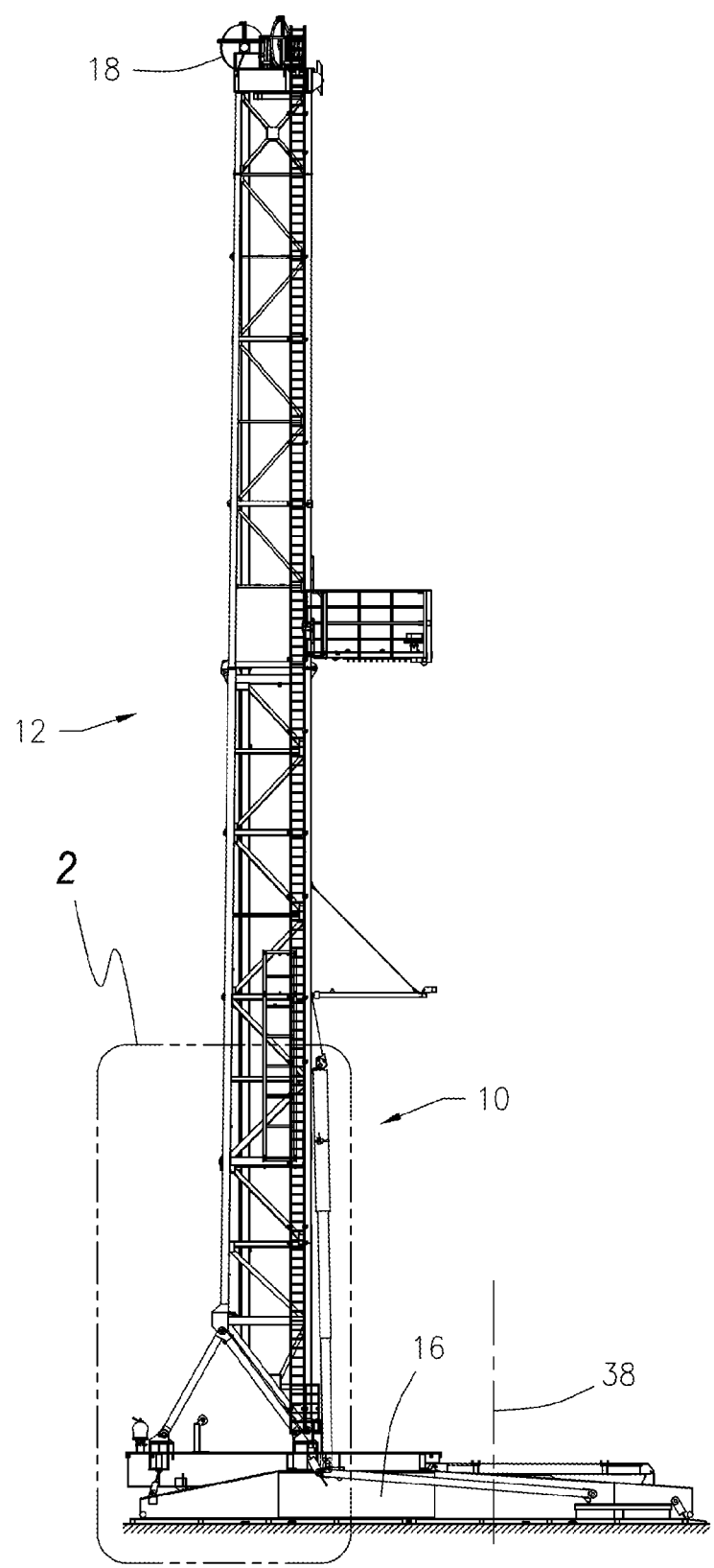
FIG. 1 illustrates a side view of a mast incorporating a cylinder alignment monitoring system constructed in accordance with the present invention.
Figure 2:
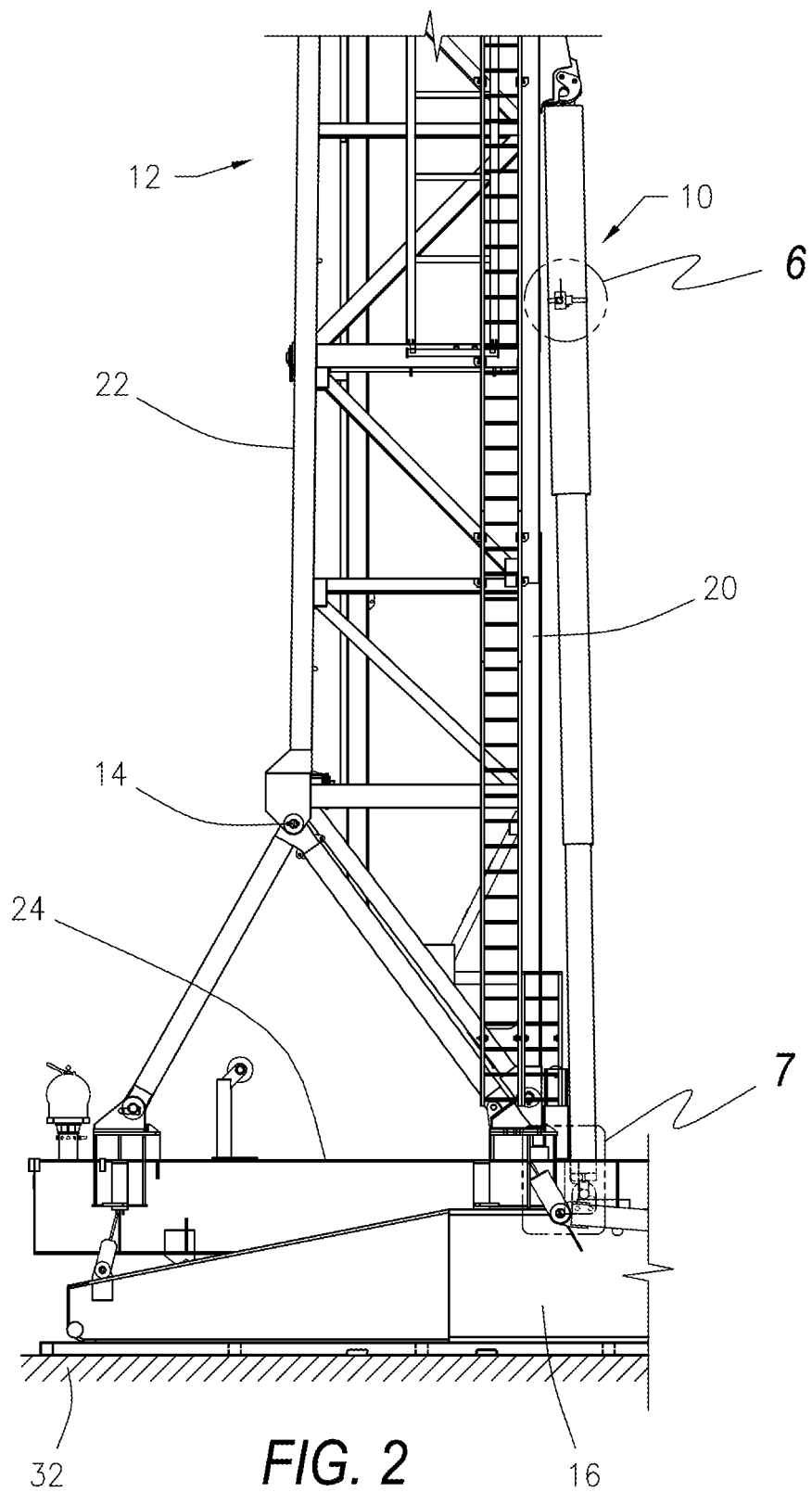
FIG. 2 illustrates an enlarged view of a portion of the mast along with the cylinder alignment monitoring system shown in FIG. 1.

Referring to the drawings in detail, FIG. 1 illustrates a side view of a mast 12 incorporating a cylinder alignment monitoring system 10 of the present invention. FIG. 2 illustrates an enlarged view of a portion of the mast 12 along with the cylinder alignment monitoring system 10 shown by dashed lines 2-2 in FIG. 1. The mast 12 is shown raised to the vertical upright use position in FIGS. 1 and 2. Once the mast 12 has been raised, the drill floor will thereafter be raised upward spaced from the substructure 16. Once raised, the mast 12 will be over the well centerline 38.

The mast 12 includes a pair of opposed sides with the one side visible in FIGS. 1 and 2. The mast 12 may be fabricated from a single section or a series of sections. The mast 12 also supports a crown block 18 which reciprocates a moving block and tackle.

Figure 3:
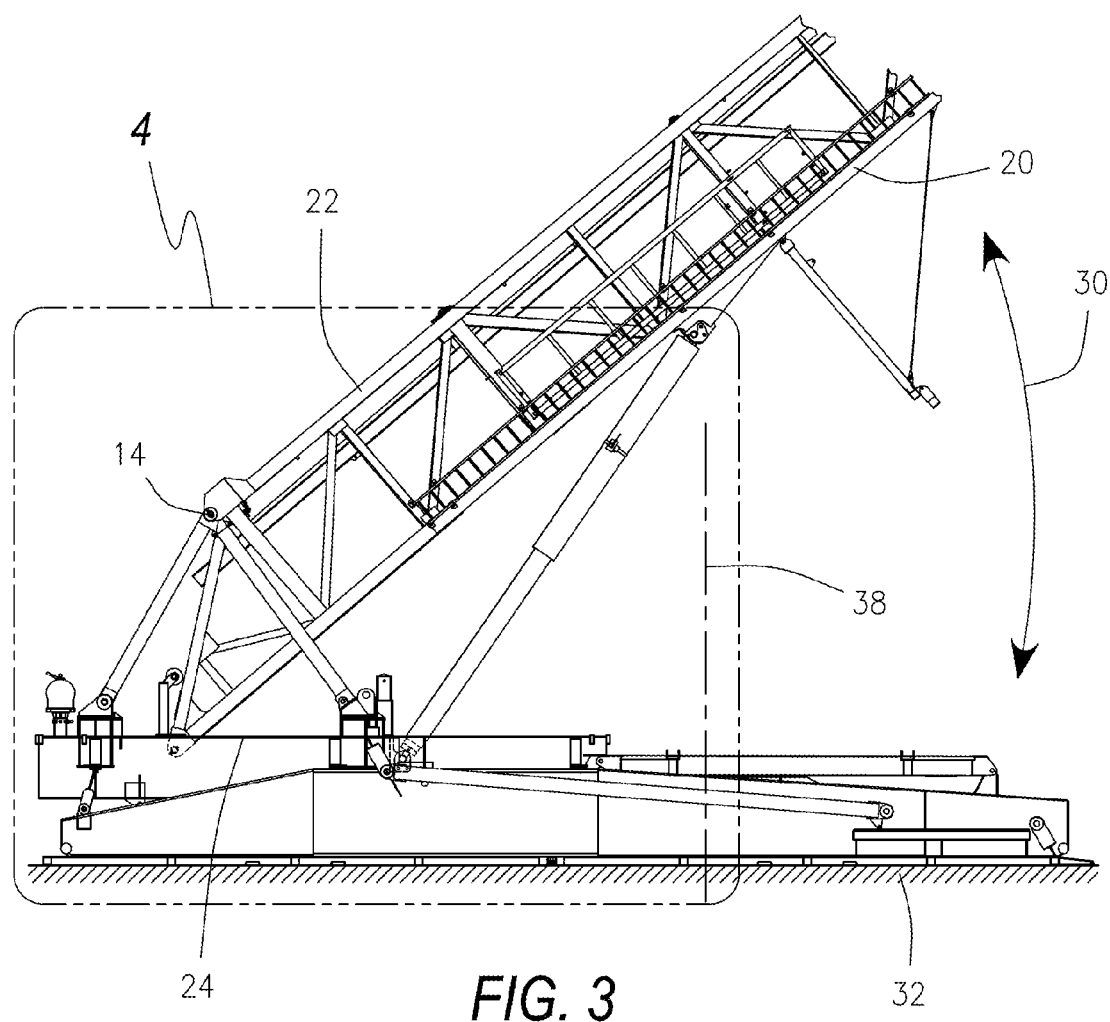
FIG. 3 illustrates an enlarged view of a portion of the mast moved part of the way between the substantially horizontal storage and transportation position and an upright use position shown in FIGS. 1 and 2.
Figure 4:
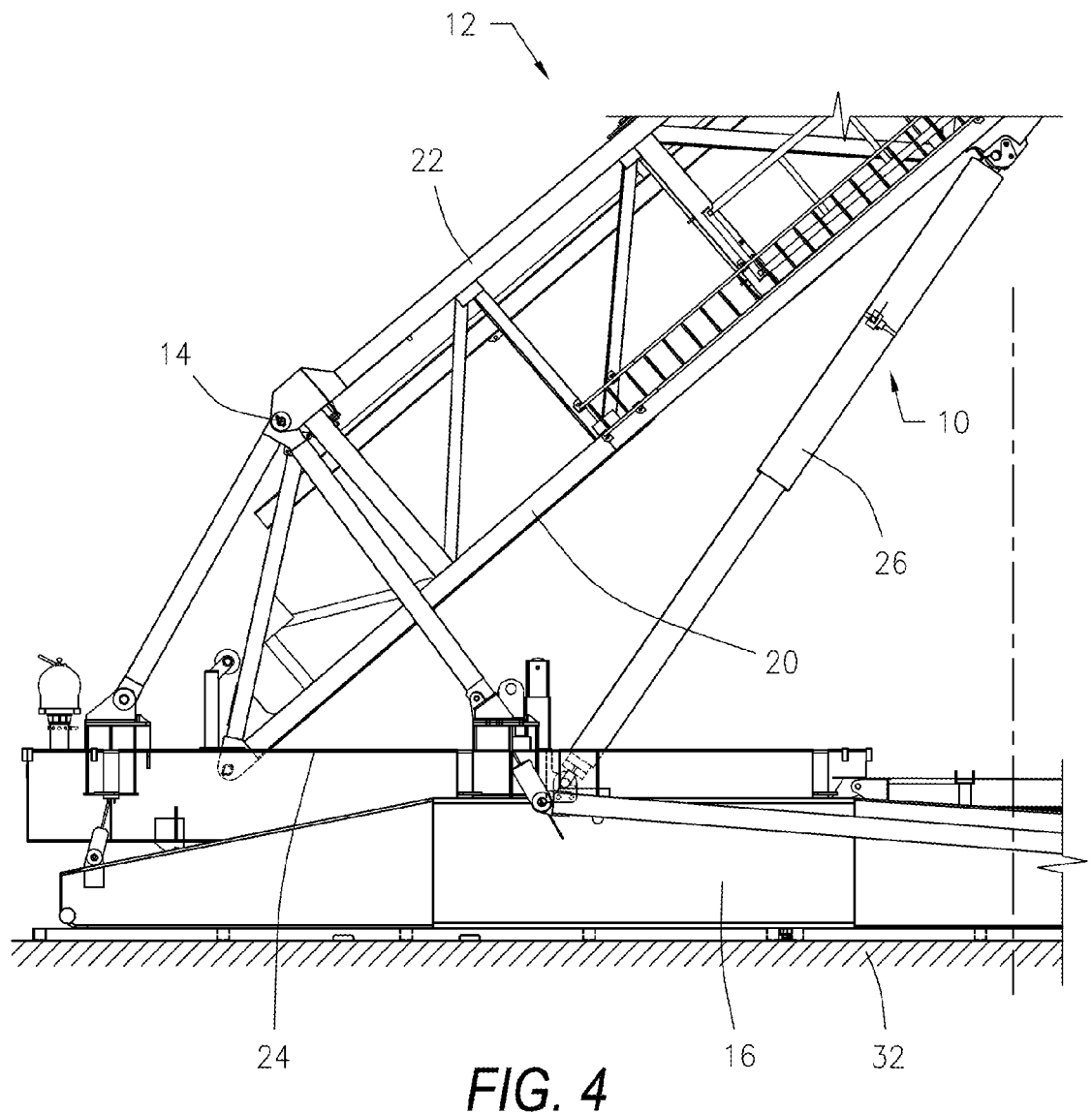
FIG. 4 illustrates an enlarged view of a portion of the mast along with the cylinder alignment monitoring system shown in FIG. 3.

FIG. 3 illustrates an enlarged view of a portion of the mast 12 a portion of the way between the substantially horizontal storage and transportation position and the upright use position shown in FIGS. 1 and 2. Arrows 30 illustrate the movement of the mast 12. FIG. 4 illustrates an enlarged view of a portion of the mast 12 along with the monitoring system 10.

The mast 12 rotates about a pair of hinges 14. The mast 12 may be supported on a platform at ground level 32 or, alternatively may be supported on a drill floor 24 on a substructure 16. After the mast 12 has been raised to the upright use position, the drill floor will be raised so that it is spaced from ground level.

Figure 5:
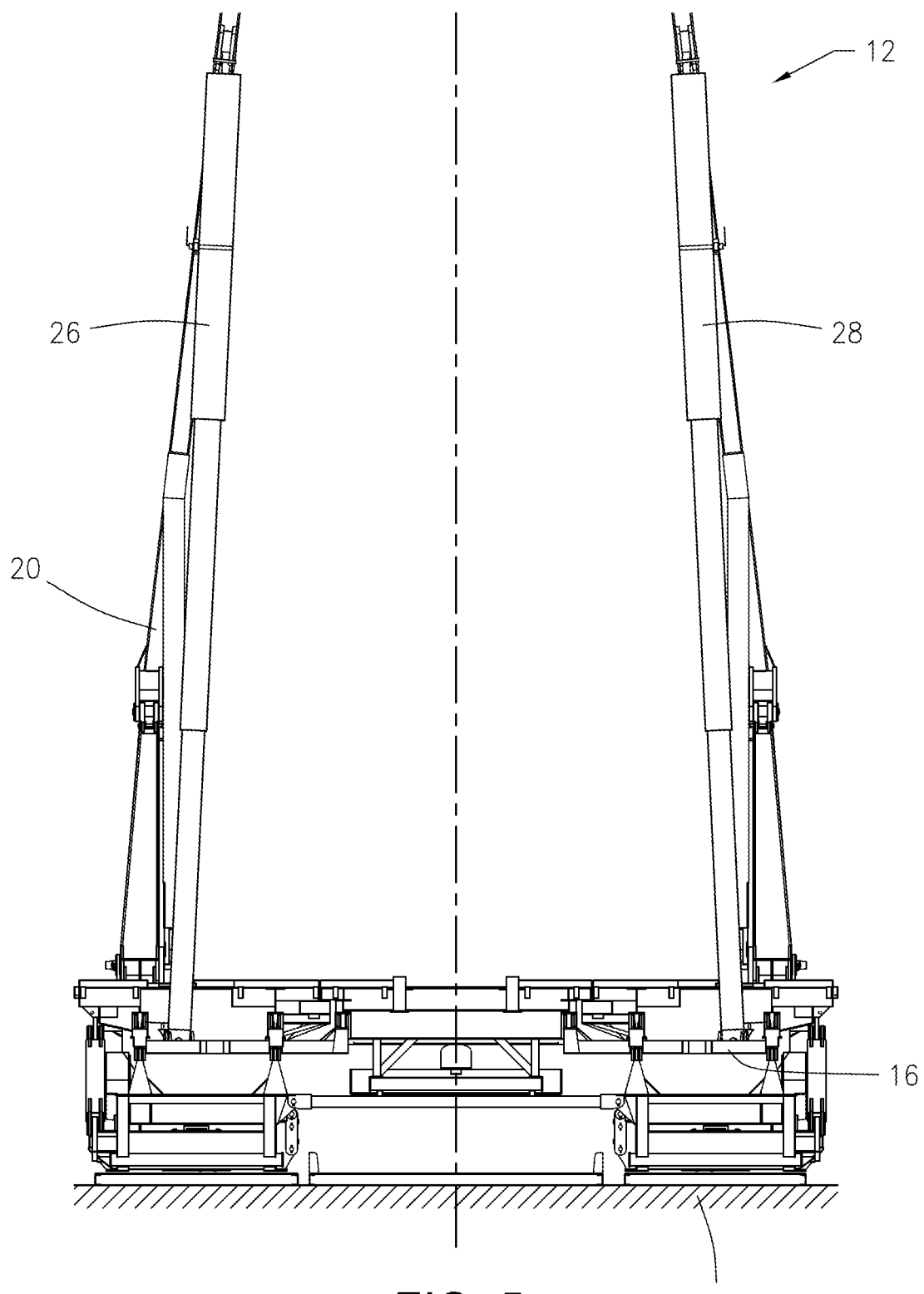
FIG. 5 illustrates a sectional view of a front or V door view of the mast along with the cylinder monitoring alignment monitoring system.

As seen in FIGS. 1 through 4, the mast includes a front leg 20 and a rear leg 22. FIG. 5 illustrates a sectional view of a front or V-door view of the mast 12 along with a cylinder alignment monitoring system 10. The opposed front legs 20 and 38 are visible.

A pair of tubular, telescoping hydraulic cylinders 26 and 28 each extends between the drill floor 24 on the substructure 16 and the mast assembly 12. The hydraulic cylinders 26 and 28 are used to raise and lower the mast. Hydraulic cylinders are utilized in a preferred embodiment of the present invention although other types of cylinders, such as pneumatic cylinders, might be employed within the spirit and scope of the invention. The hydraulic cylinders 26 and 28 each have an extending ram and are extended in the in-use, operational position. Conversely, the ram of each of the cylinders is retracted in the substantially horizontal transport and storage position. The mast assembly 12 moves between the vertical upright operational position shown in FIGS. 1, 2 and 5 and a horizontal, transport and storage position. FIGS. 3 and 4 illustrate the mast 12 partially moved between the vertical operational position and the horizontal storage position. Each of the hydraulic cylinders 26 and 28 are pinned to the substructure 16 and to the mast.

Figure 6:
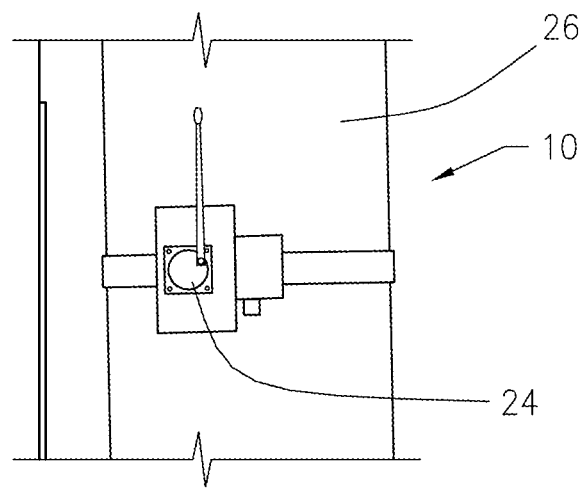
FIG. 6 illustrates an enlarged view of a portion shown by dashed lines in FIG. 4.

FIG. 6 illustrates an enlarged view of a portion shown by dashed lines in FIG. 4. The monitoring system 10 includes a distance measurement device which includes a projector and receiver module 34 attached to the hydraulic cylinder 26. One projector and receiver module 34 is attached to each hydraulic cylinder 26 and 28. The module 34 may be permanently or as in the present embodiment detachably connected to the cylinder. The projector and receiver module 34 includes a laser projector and a laser receiver sensor. The laser projector and receiver module 34 emits a laser light which is returned to the module 34 by a reflector (to be described).

Figure 7:
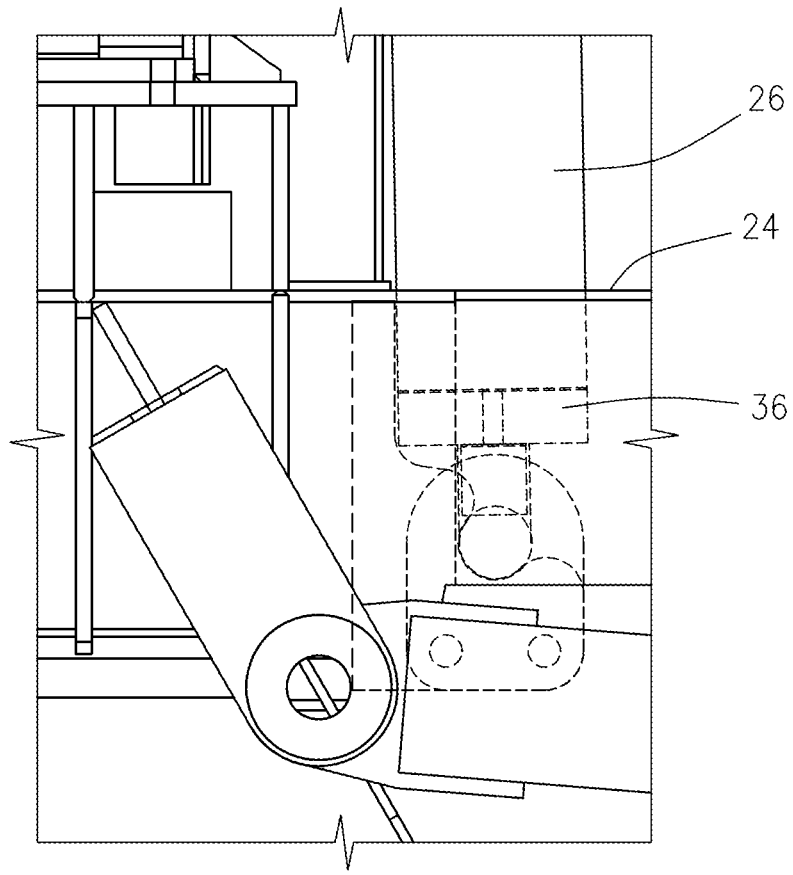
FIG. 7 illustrates an enlarged portion shown by dashed lines in FIG. 4.

FIG. 7 illustrates an enlarged portion shown by dashed lines in FIG. 4 at the base of the hydraulic cylinder 26. A target module 36 is attached at or to each of the hydraulic cylinders 26. The target module 36 reflects the laser light beam transmitted from the laser projector back to the module 34.

Figure 8:
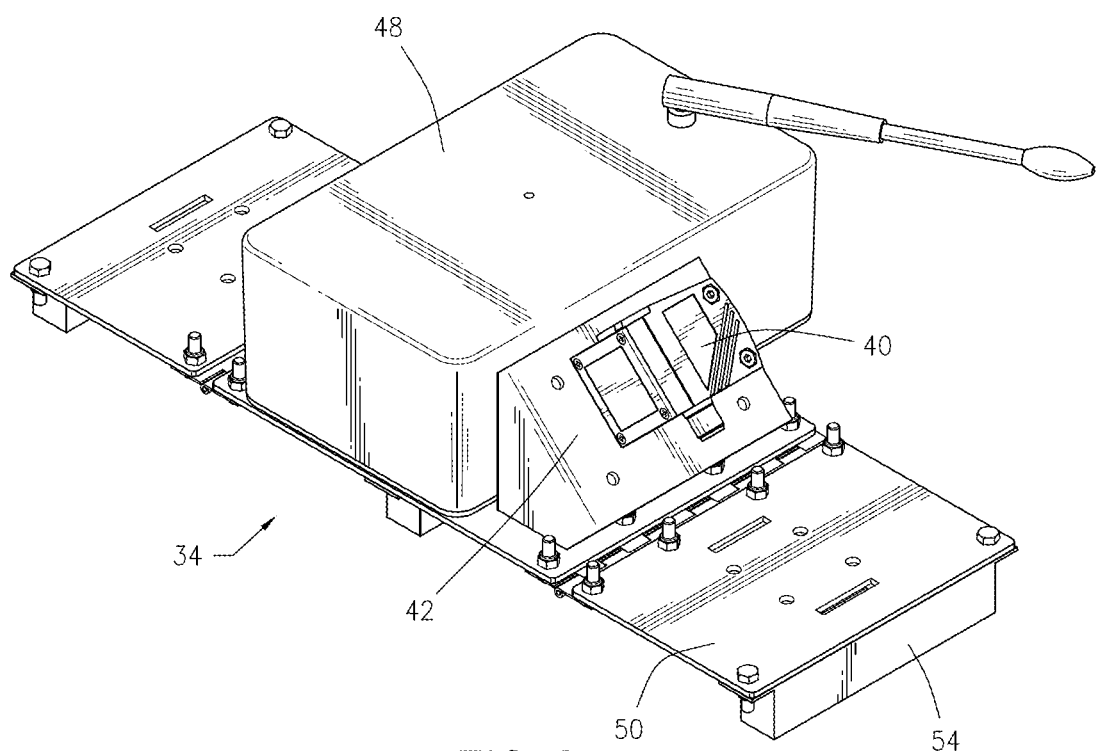
FIG. 8 illustrates a perspective view.
Figure 9:
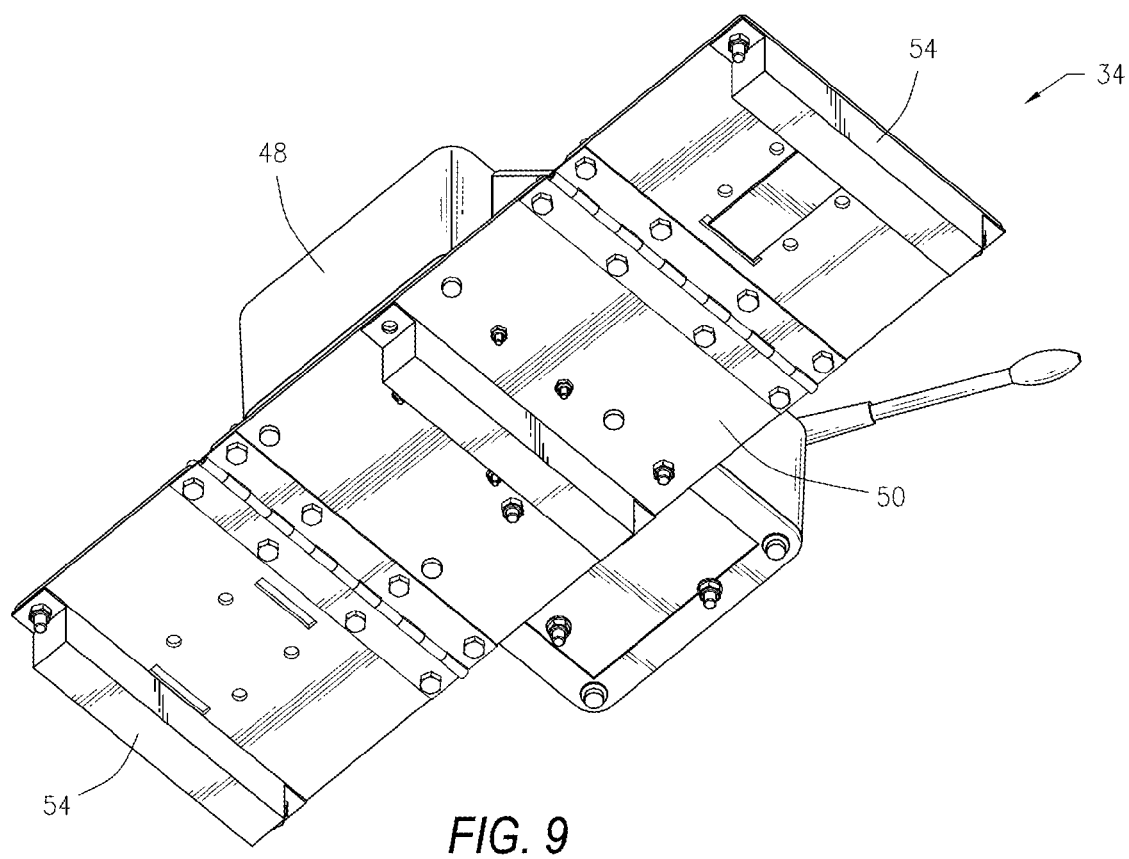
FIG. 9 illustrates a bottom perspective view.
Figure 10:
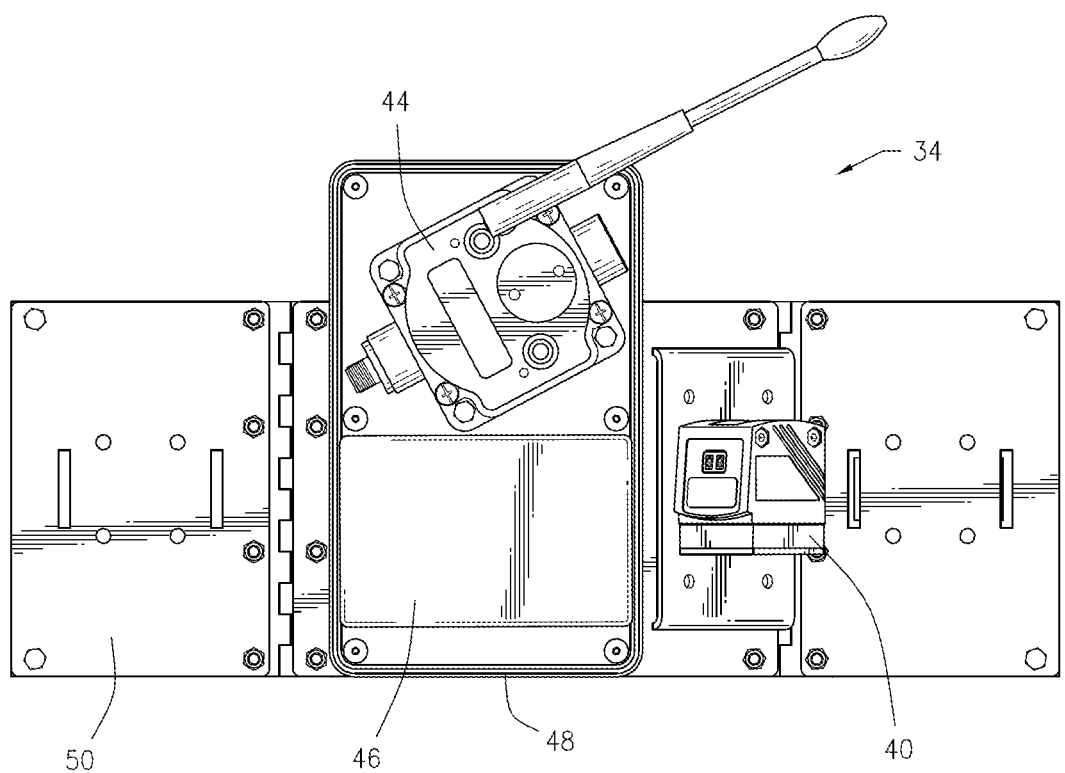
FIG. 10 illustrates a top view.
Figure 11:
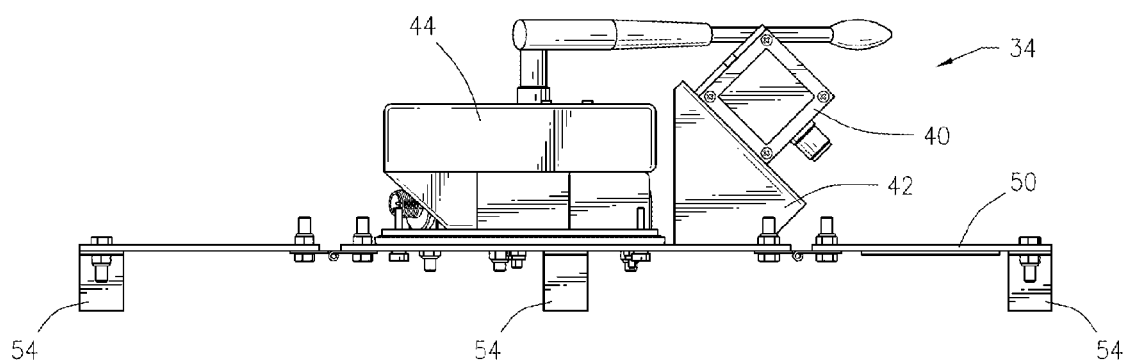
FIG. 11 illustrates a side view.
Figure 12:
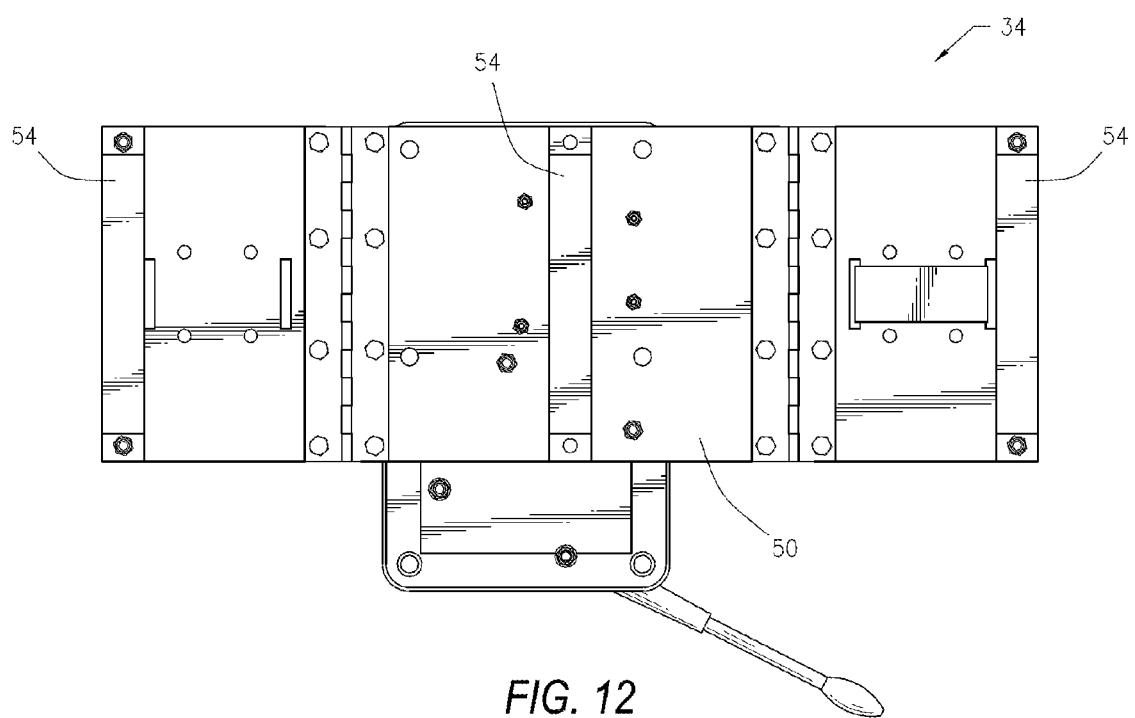
FIG. 12 illustrates a bottom view of a projector and receiver module of the cylinder alignment monitoring system apart from the hydraulic cylinder.

FIG. 8 illustrates a perspective view, FIG. 9 illustrates a bottom perspective view, FIG. 10 illustrates a top view, FIG. 11 illustrates a side view and FIG. 12 illustrates a bottom view of a projector and receiver module 34 apart from the hydraulic cylinder 26. The projector and receiver module 34 includes a distance sensor 40 mounted on a bracket 42. The distance sensor 40 projects and receives the laser light and calculates a distance between the sensor and the target module 36. The distance maybe calculated based on the time it takes for the laser light to return. The module 34 also includes a wireless communication transmitter and receiver 44 which is visible in FIG. 10.

The module 34 also includes a battery 46 to power both the wireless transmitter and receiver 44 and the distance sensor 40. The wireless transmitter and receiver 44 and the battery 46 may be retained in a housing 48 (shown with its cover removed in FIG. 10).

The projector and receiver module 34 may be secured to the hydraulic cylinder by a mounting bracket 50. The mounting bracket 50 may be articulated by hinges to fit around the cylinder. In a preferred embodiment the mounting bracket is detachably connected to the hydraulic cylinder by a plurality of magnets 54.

Figure 13:
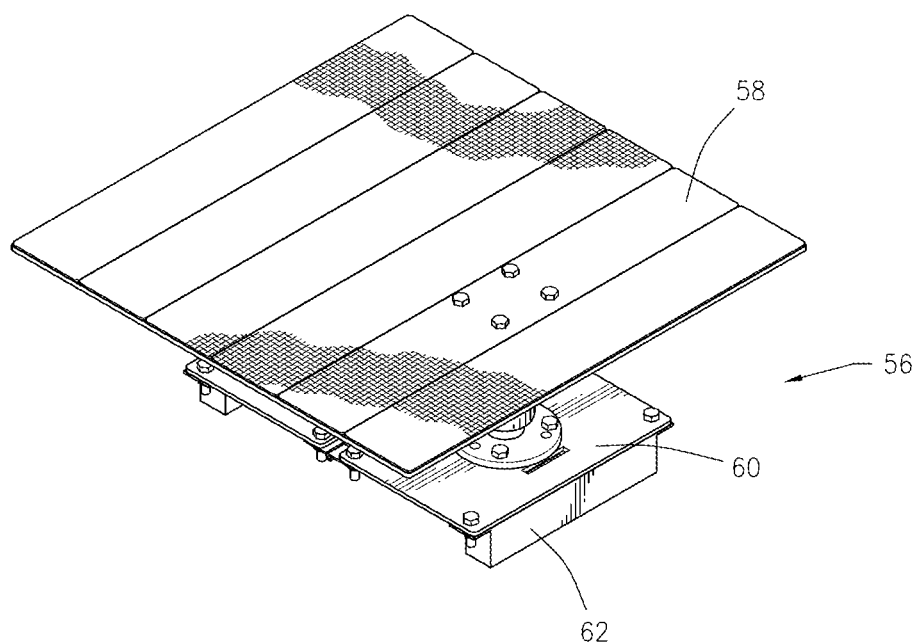
FIG. 13 illustrates a perspective view.
Figure 14:
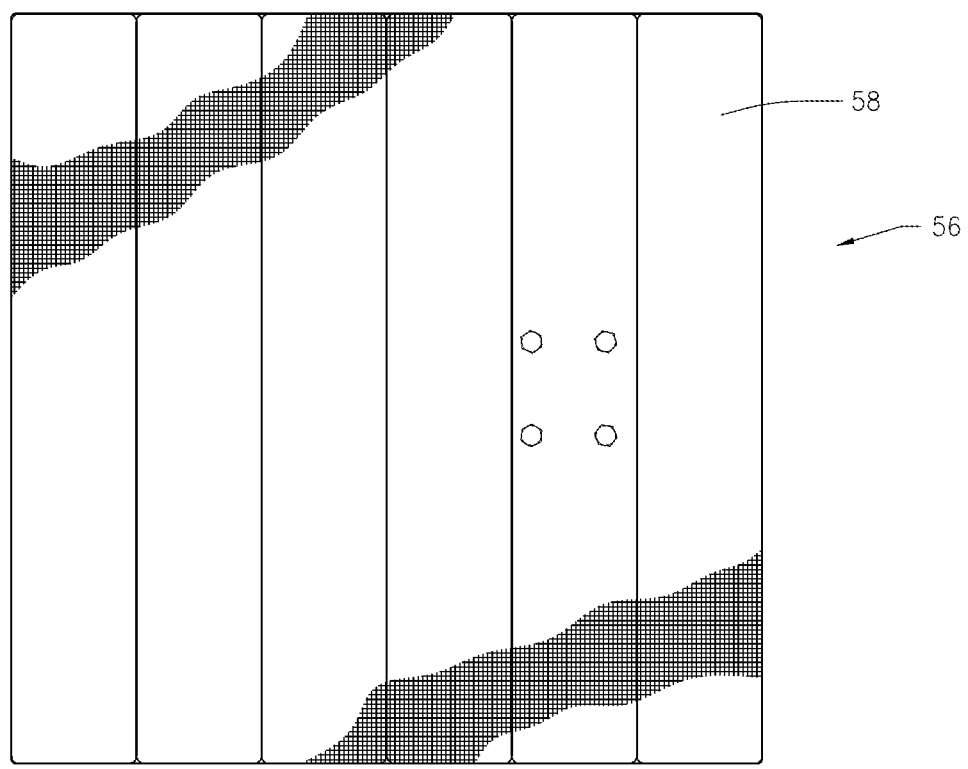
FIG. 14 illustrates a top view.
Figure 15:
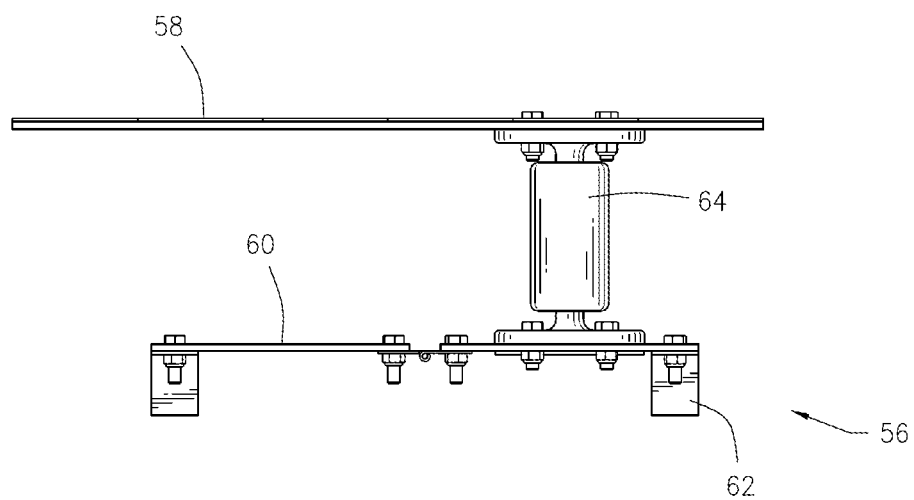
FIG. 15 illustrates a side view of a target module of the cylinder alignment monitoring system apart from the hydraulic cylinder.

FIG. 13 illustrates a perspective view, FIG. 14 illustrates a top view, and FIG. 15 illustrates a side view of a target module 56 of the cylinder alignment monitoring system 10. The target module 56 includes a substantially flat reflector surface 58. The target module 56 may also include an attachment bracket 60 having magnets 62 to attach to a ram to one of the hydraulic cylinders 26 or 28. Between the reflector surface 58 and the attachment bracket 60 is a socket arm 64 in order to permit adjustment of the reflector surface 58.

Figure 16:
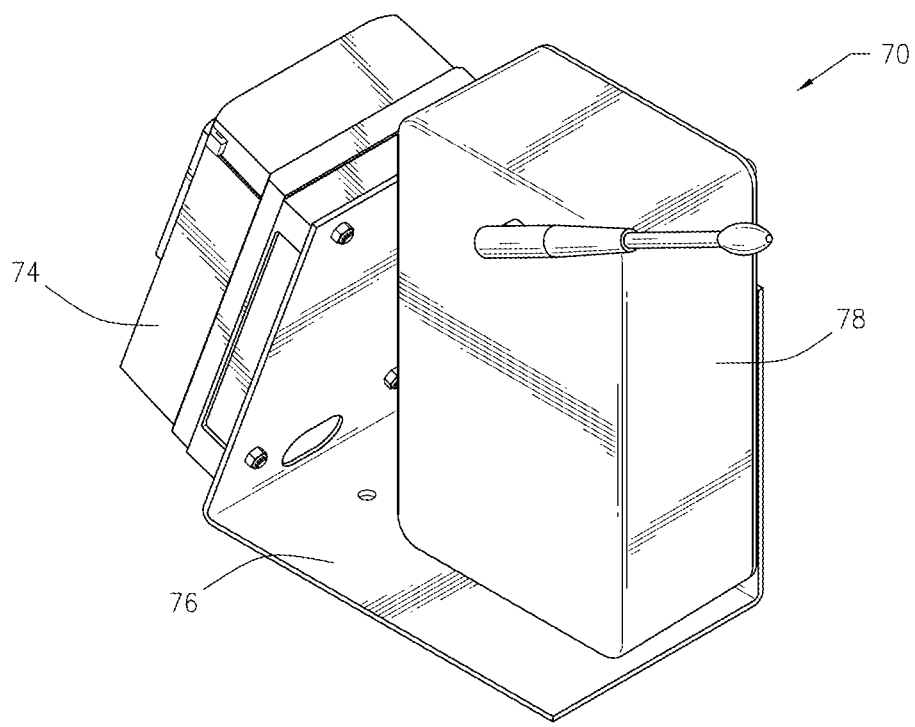
FIG. 16 illustrates a perspective view.
Figures 17, 18:
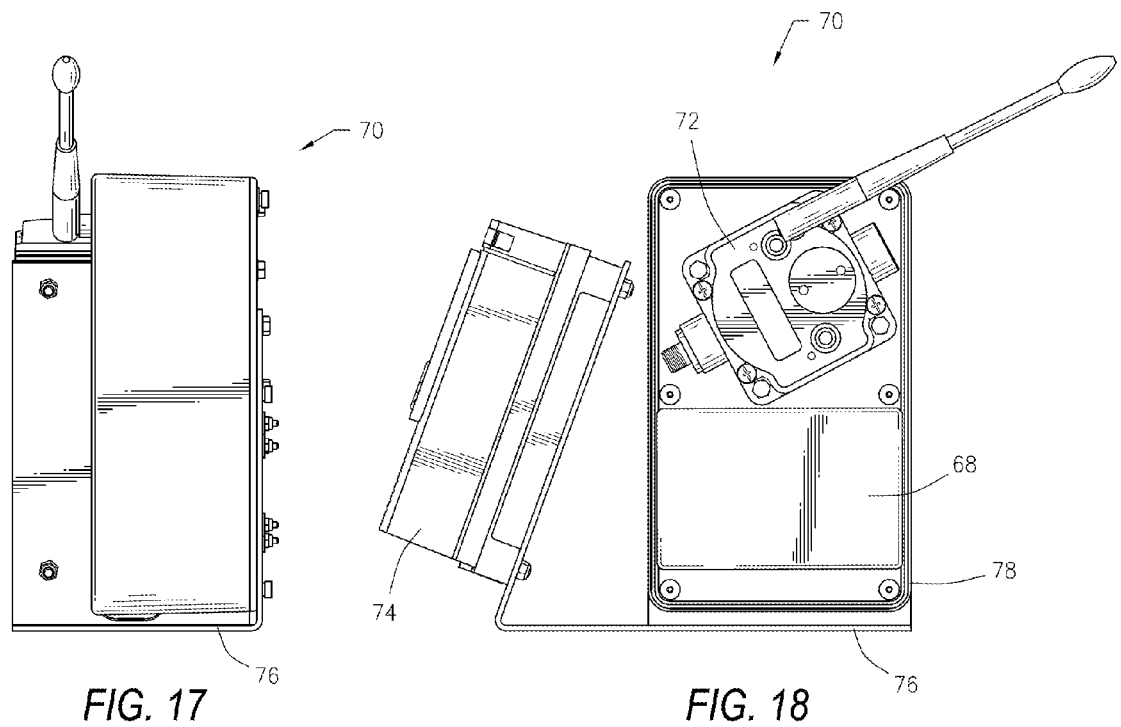
FIG. 17 illustrates a side view.
FIG. 18 illustrates a front view.
Figure 19:
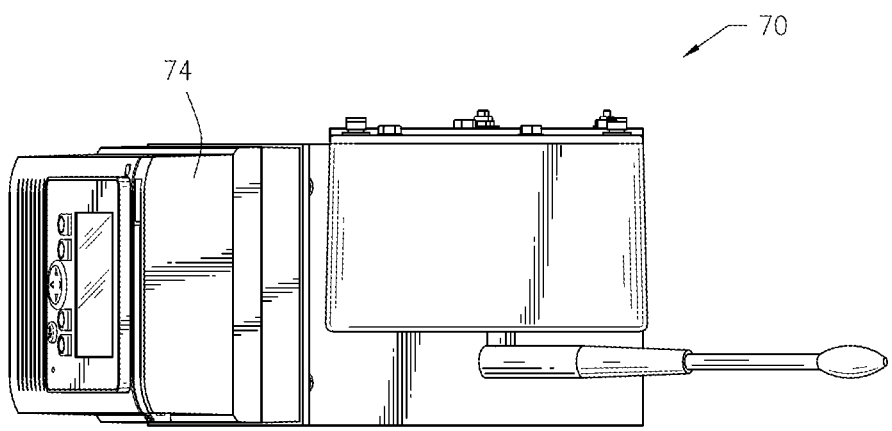
FIG. 19 illustrates a top view of a comparison device of the cylinder alignment monitoring system.

FIG. 16 illustrates a perspective view, FIG. 17 illustrates a side view, FIG. 18 illustrates a front view and FIG. 19 illustrates a top view of a comparison device 70. The comparison device 70 is wirelessly connected to each of the distance measurement devices by a wireless communication node 72. The comparison device 70 receives information on the extension distance of each of the hydraulic cylinders from the distance measurement devices. The information is communicated to a display controller 74 which receives information on the distances extended. The communication node 72 and display controller 74 may be mounted on a bracket 76 for the comparison device 70. The communication node 72 along with a battery 68 may be retained in a housing 78.

When the difference between the distances measured for each of the extending cylinders exceeds a pre-determined amount, an alarm may be generated. Data may also be displayed on the display controller 74.

Figure 20:
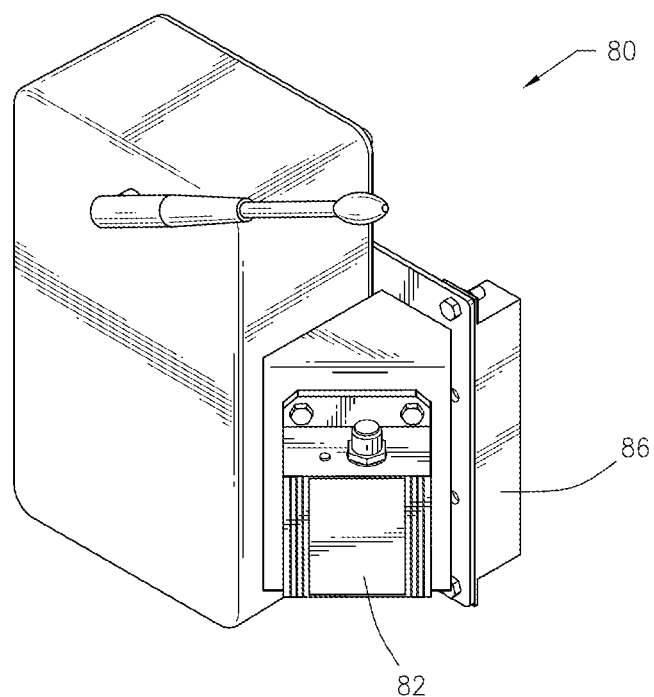
FIG. 20 illustrates a perspective view.
Figure 21:
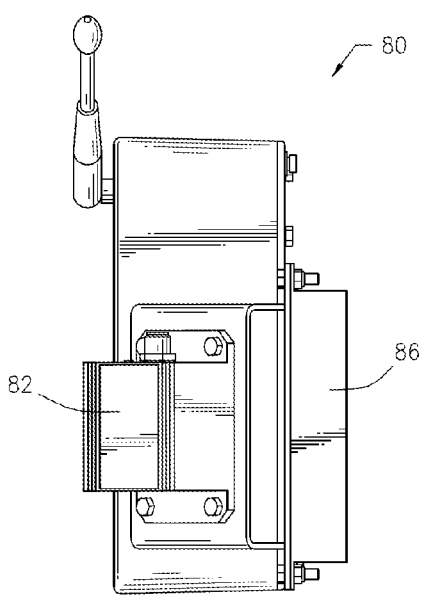
FIG. 21 illustrates a side view.
Figure 22:
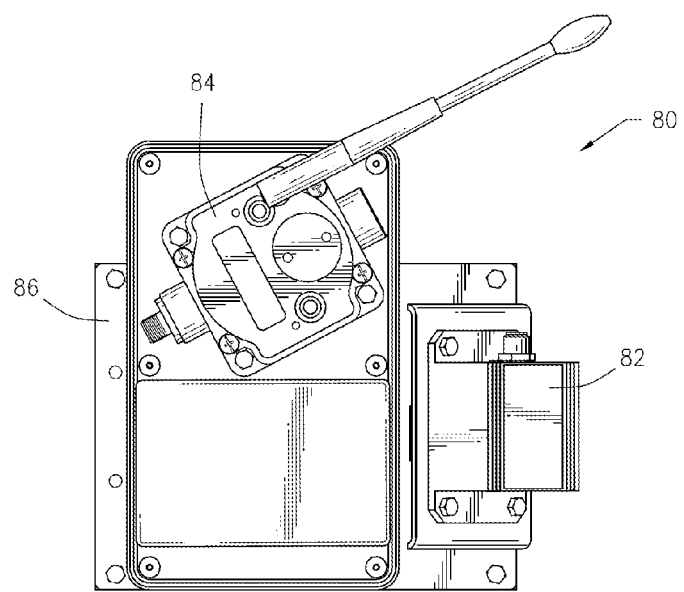
FIG. 22 illustrates a front view of an optional angle sensor module of the cylinder alignment monitoring system.

FIG. 20 illustrates a perspective view, FIG. 21 illustrates a side view and FIG. 22 illustrates a front view of an optional angle sensor module 80. The angle sensor module 80 would be attached to one of the extending cylinders or, in a preferred embodiment, attached to one of the mast legs.

The angle sensor module 80 includes an angle sensor 82 which is capable of sensing the angle of the mast leg from a horizontal orientation. The angle sensor may operate in a number of ways such as an electronic accelerometer. The angle sensor module 80 also includes a wireless communication node 84 for receiving data information from the angle sensor 82 and transmitting to the comparison device 70. The angle sensor 82 and the wireless communication node 84 of the module 80 may be mounted on a bracket 86. The wireless communication node 84 and a battery 88 may be retained in a housing 90.

The present invention is a system or process that feeds information in the way of an alarm and/or differential measurements to an operator who decides how to correct any misalignment. A further option would be to program a computer or PLC to use this comparative information to generate additional flow to one of the cylinders to create a more synchronous extension or retraction of the mast or derrick.

Whereas, the present invention has been described in relation to the drawings attached hereto, it should be understood that other and further modifications, apart from those shown or suggested herein, may be made within the spirit and scope of this invention.

What is claimed is:

1. A cylinder alignment monitoring system for a mast or derrick hingedly connected to a substructure, wherein at least a pair of extending cylinders move said mast or derrick between a storage position and an upright use position, each of said extending cylinders having an upper end attached to said mast or derrick and a lower end attached to said substructure, which monitoring system comprises:
   a distance measurement device to determine the extension distance of each of said extending cylinders wherein said distance measurement device includes a projector and receiver module attached to each of said hydraulic cylinders near said upper end of each said extending cylinder, and a target module attached to each said extending cylinder near said lower end of said extending cylinder; and
   a comparison device to compare the distances measured for each of said extending cylinders.

2. A cylinder alignment monitoring system for a mast or derrick as set forth in claim 1 wherein said comparison device is wirelessly connected to said distance measurement device.

3. A cylinder alignment monitoring system for a mast or derrick as set forth in claim 1 wherein said projector module includes a laser projector and a laser receiver.

4. A cylinder alignment monitoring system for a mast or derrick as set forth in claim 1 wherein said target module includes a reflector.

5. A cylinder alignment monitoring system for a mast or derrick as set forth in claim 1 including an angle sensor on each of said extending cylinders.

6. A cylinder alignment monitoring system for a mast or derrick as set forth in claim 1 wherein one said distance measurement device is magnetically attached to each of said extending cylinders.

7. A cylinder alignment monitoring system for a mast or derrick as set forth in claim 1 wherein said distant measurement device is retained in a housing.

8. A cylinder alignment monitoring system for a mast or derrick as set forth in claim 1 wherein said comparison device includes generation of an alarm when the difference between the distances measured for each of said extending cylinders exceeds a predetermined amount.

9. A cylinder alignment monitoring system for a mast or derrick as set forth in claim 1 wherein each of said extending cylinders is a hydraulic cylinder having an extending ram.

10. A process for monitoring cylinder alignment for a mast or derrick wherein at least a pair of extending cylinders move the mast or derrick between a storage position and an upright use position; which process comprises:
    determining the extension distance of each of the extending cylinders with a distance measurement device through the steps of projecting a laser light from a projector and receiver module on each said cylinder, reflecting said laser light with a target module on each said cylinder back to said projector and receiver module, and calculating a distance between said projector and receiver module and said target module;
    transmitting the extension distance from each of the extending cylinders to a comparison device; and
    comparing the extension distance from each of the extending cylinders.

11. A process to monitor cylinder alignment as set forth in claim 10 including the additional step of generating an alarm when the difference between the distances measured for each of the extending cylinders exceeds a predetermined amount.

12. A cylinder alignment monitoring system for a mast or derrick hingedly connected to a substructure, wherein at least a pair of extending cylinders move said mast or derrick between a storage position and an upright use position, each of said extending cylinders having an upper end attached to said mast or derrick and a lower end attached to said substructure, which monitoring system comprises:
    a distance measurement device to determine the extension distance of each of said extending cylinders wherein said distance measurement device includes a projector and receiver module attached to each of said hydraulic cylinders near said lower end of each said extending cylinder and a target module attached to each said extending cylinder near said upper end of said extending cylinder; and
    a comparison device to compare the distances measured for each of said extending cylinders.

13. A cylinder alignment monitoring system for a mast or derrick as set forth in claim 12 wherein said projector module includes a laser projector and a laser receiver.

14. A cylinder alignment monitoring system for a mast or derrick as set forth in claim 12 wherein said target module includes a reflector.

15. A cylinder alignment monitoring system for a mast or derrick as set forth in claim 12 including an angle sensor on each of said extending cylinders.

16. A cylinder alignment monitoring system for a mast or derrick as set forth in claim 12 wherein one said distance measurement device is magnetically attached to each of said extending cylinders.

17. A cylinder alignment monitoring system for a mast or derrick as set forth in claim 12 wherein said comparison device includes generation of an alarm when the difference between the distances measured for each of said extending cylinders exceeds a predetermined amount.

18. A cylinder alignment monitoring system for a mast or derrick as set forth in claim 12 wherein said distance measurement device is retained in a housing.

19. A cylinder alignment monitoring system for a mast or derrick as set forth in claim 12 wherein each of said extending cylinders is a hydraulic cylinder having an extending ram.

\* \* \* \* \*